US008704900B2

(12) United States Patent
Watanabe et al.

(10) Patent No.: US 8,704,900 B2
(45) Date of Patent: Apr. 22, 2014

(54) IMAGING APPARATUS AND IMAGING METHOD

(75) Inventors: Go Watanabe, Tokyo (JP); Toshiki Hatori, Tokyo (JP); Takeshi Kawano, Tokyo (JP); Ryuuichi Sawada, Tokyo (JP)

(73) Assignee: Kyocera Corporation, Kyoto (JP)

( * ) Notice: Subject to any disclaimer, the term of this patent is extended or adjusted under 35 U.S.C. 154(b) by 840 days.

(21) Appl. No.: 12/090,242

(22) PCT Filed: Oct. 11, 2006

(86) PCT No.: PCT/JP2006/320310
§ 371 (c)(1),
(2), (4) Date: Oct. 8, 2009

(87) PCT Pub. No.: WO2007/043575
PCT Pub. Date: Apr. 19, 2007

(65) Prior Publication Data
US 2010/0053349 A1   Mar. 4, 2010

(30) Foreign Application Priority Data

Oct. 14, 2005  (JP) ................................. 2005-300218
May 30, 2006  (JP) ................................. 2006-150691

(51) Int. Cl.
*H04N 5/225*   (2006.01)
(52) U.S. Cl.
USPC ............. 348/208.13; 348/208.12; 348/208.99
(58) Field of Classification Search
USPC .............................. 348/208.99–208.16, 222.1
See application file for complete search history.

(56) References Cited

U.S. PATENT DOCUMENTS

| 5,517,242 | A | 5/1996 | Yamada et al. | 348/254 |
| 6,683,704 | B1 * | 1/2004 | Spears et al. | 358/483 |
| 7,688,353 | B2 * | 3/2010 | Ishikawa et al. | 348/208.5 |
| 2004/0239779 | A1 * | 12/2004 | Washisu | 348/239 |

(Continued)

FOREIGN PATENT DOCUMENTS

| JP | 07-075026 | 3/1995 |
| JP | 10-108079 | 4/1998 |
| JP | 2003-009006 | 1/2003 |
| JP | 2004-229259 | 8/2004 |

OTHER PUBLICATIONS

Chinese language office action dated Jan. 6, 2011 and its English language translation for corresponding Chinese application 200680047337.1.

(Continued)

*Primary Examiner* — Sinh Tran
*Assistant Examiner* — Christopher K Peterson
(74) *Attorney, Agent, or Firm* — DLA Piper LLP (US)

(57) ABSTRACT

An imaging apparatus and an imaging method able to obtain images having no blurring with a small number of images under different exposure conditions and capable of shortening a processing time, wherein an imaging apparatus 10 captures a plurality of images including an image having a short exposure time and high resolution, but having much noise and an image having a long exposure time, but having little noise and low resolution by an optical system 11 and an imaging element 12. After the signal processing of a signal processing part 13, a CPU 14 detects positional deviation among the captured images and blurring, changes the ratio of the plurality of images according to the distances from the edge, and combines these to thereby form an image free from blurring and reducing noise.

16 Claims, 3 Drawing Sheets

(56) References Cited

U.S. PATENT DOCUMENTS

| | | | |
|---|---|---|---|
| 2006/0017837 A1* | 1/2006 | Sorek et al. | 348/362 |
| 2006/0291741 A1* | 12/2006 | Gomi et al. | 382/266 |
| 2007/0098288 A1* | 5/2007 | Raskar et al. | 382/254 |
| 2008/0123998 A1* | 5/2008 | Gomi et al. | 382/300 |

OTHER PUBLICATIONS

Japanese language office action dated Jul. 5, 2011 and its English language translation for corresponding Japanese application 2006150691.

* cited by examiner

IMAGES CAPTURED UNDER
DIFFERENT EXPOSURE CONDITIONS

FIG. 3A  FIG. 3B  FIG. 3C

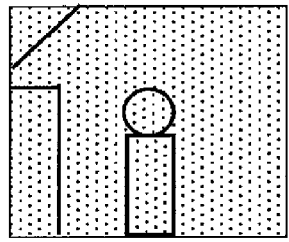 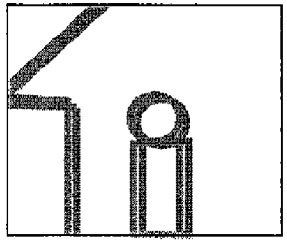 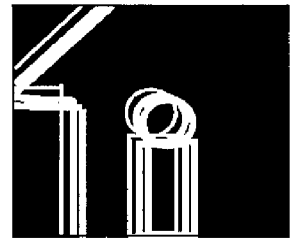

SHORT TIME EXPOSURE SENSITIVITY OF CCD IS HIGH, NOISE IS HIGH, BUT RESOLUTION IS GOOD

LONG TIME EXPOSURE SENSITIVITY OF CCD IS LOW, NOISE IS LOW, BUT RESOLUTION IS BAD

DIFFERENCE IMAGE OF SHORT TIME EXPOSURE − LONG TIME EXPOSURE IMAGE IN WHICH ONLY EDGE PORTION OF SUBJECT BY POSITIONAL DEVIATION AND BLURRING APPEARS

DIFFERENCE IMAGES CAPTURED UNDER DIFFERENT EXPOSURE CONDITIONS

FIG. 4A  FIG. 4B  FIG. 4C

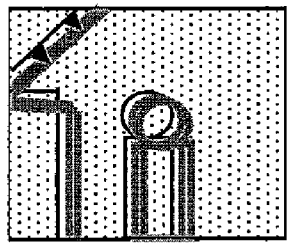 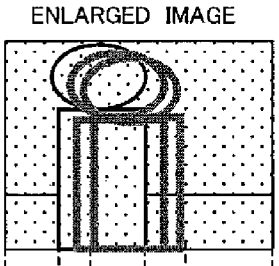 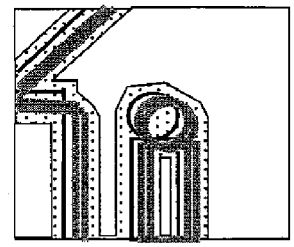

BEFORE IMAGE PROCESSING

ENLARGED IMAGE

SIGNAL — SHORT TIME EXPOSURE SIGNAL

LONG TIME EXPOSURE SIGNAL

COMBINATION RATIO — SHORT TIME EXPOSURE

LONG TIME EXPOSURE

DIFFERENCE IMAGE AND RATIO IN COMBINATION

OUTPUT IMAGE

IMAGING APPARATUS AND IMAGING METHOD

CROSS REFERENCE TO RELATED APPLICATION

This application is a national stage of International Application No. PCT/JP2006/320310 filed on Oct. 11, 2006, and claims the benefit of priority under 35 USC 119 of Japanese Patent Application No. 2005-300218 filed on Oct. 14, 2005 and Japanese Patent Application No. 2006-150691 filed on May 30, 2006, which are incorporated herein by reference.

TECHNICAL FIELD

The present invention relates to an imaging apparatus and an imaging method able to reduce noise by combining captured images.

BACKGROUND ART

In recent years, imaging apparatuses, specifically cameras, have been made increasingly compact. Attention is being focused on hand shake correction techniques.

Due to the increasing compactness of cameras, there has been a drop in holdability when taking pictures. Further, the degree of freedom in the method of taking pictures by mobile phone-mounted cameras etc. is increasing compared with past ways of taking pictures such as with one-handed picture-taking.

In this way, when taking pictures, when taking pictures by various methods and in unstable states, the camera shakes and the image ends up blurring when pressing the shutter button.

For example, there are many cases where the shutter speed becomes slow and the image blurs when taking a picture under dark conditions with a long exposure time.

Further, when raising the sensitivity in the exposure conditions and making the exposure time shorter, noise enters and the image ends up becoming rough.

In order to solve this problem, devices for correcting the hand shake are being mounted in single-lens reflex cameras and, recently, in compact cameras as well.

For example, optical hand shake correction devices inclining the lens in accordance with the blurring to correct the hand shake are being manufactured. However, if considering the recent increased compactness and mounting in mobile phone cameras, use of these becomes very difficult space-wise.

Further, as another method, a variety of imaging apparatuses able to obtain images free from blurring from among a plurality of images by image processing are being proposed (see for example Patent Document 1).

Patent Document 1: Japanese Patent Publication (A) No. 10-108079

DISCLOSURE OF THE INVENTION

Problem to be Solved by the Invention

However, the above proposed imaging apparatus has the disadvantage that a memory for holding a plurality of images becomes necessary, so the apparatus becomes expensive.

Further, this apparatus has the disadvantage that the larger the number of pictures taken, the longer the processing time for correcting positional deviation between images occurring during the picture-taking.

An object of the present invention is to provide an imaging apparatus and an imaging method able to obtain images free from blurring with a small number of images under different exposure conditions and capable of shortening the processing time.

Means for Solving the Problem

A first aspect of the present invention is an imaging apparatus having a function of combining a plurality of images captured under different exposure conditions, having a detecting means for detecting positional deviation among the plurality of images and blurring amounts and a combining means for setting a ratio in combination of images according to a distance from an edge extracted based on detection results of the detecting means and combining images with the set ratio.

Preferably, the combining means combines images based on at least a luminance signal among a luminance signal Y and color difference signals U and V.

Preferably, the combining means combines images based on at least a G component among data of output of an imaging element.

Preferably, at least one of the plurality of images for combination includes an image having noise and a high resolution.

Preferably, at least one of the plurality of images for combination includes an image having a low resolution, but having little noise.

Preferably, the detecting means extracts positional deviation between images and a blurring amount from a difference image of the plurality of images.

Preferably, the combining means makes the ratio of an image of a long time exposure and having little noise larger as the distance from the edge becomes larger and sets an edge portion so that the ratio of an image of a short time exposure and having high resolution becomes larger.

Preferably, when the distance from the edge is nearer than a distance set in advance, the combining means combines images while making the ratio of the short time exposed image larger.

Preferably, when the distance from the edge is further than the distance set in advance, the combining means combines images while making the ratio of the long time exposed image larger.

A second aspect of the present invention is an imaging method of combining a plurality of captured images under different exposure conditions, having a first step of detecting positional deviation among a plurality of images under different exposure conditions and blurring amounts, a second step of extracting an edge based on detection results in the first step, a third step of setting a ratio in combination of an image according to a distance from the extracted edge, and a fourth step of combining images with a ratio set in the third step.

Effect of the Invention

According to the present invention, an image free from a blurring can be obtained with a small number of images under different exposure conditions, and a processing time can be shortened.

BRIEF DESCRIPTION OF THE DRAWINGS

FIG. 3A to FIG. 3C are diagrams showing an image of a Y signal component captured by short time exposure, an image of the Y signal component captured by long time exposure, and a difference image of Y signal components of a plurality of images.

FIG. 4A to FIG. 4C are diagrams showing relationships between the difference image and a ratio in combination.

DESCRIPTION OF NOTATIONS

10 . . . imaging apparatus, 11 . . . optical system, 12 . . . imaging element, 13 . . . signal processing part, 14 . . . CPU, and 15 . . . memory.

BEST MODE FOR CARRYING OUT THE INVENTION

Below, an embodiment of the present invention will be explained with reference to the drawings.

Figure 1:
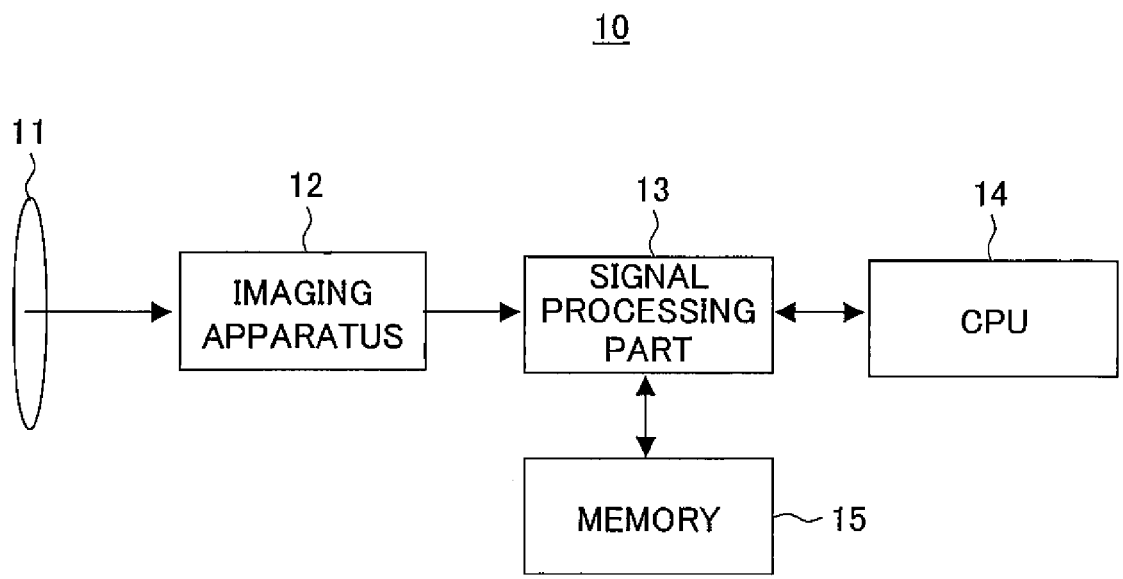
FIG. 1 is a block diagram showing an embodiment of an imaging apparatus according to the present invention.

FIG. 1 is a block diagram showing an embodiment of an imaging apparatus according to the present invention.

The present imaging apparatus 10 has an optical system 11, imaging element 12, signal processing part 13, CPU 14 as a control and operational unit, and memory 15.

The imaging apparatus 10 of the present embodiment has a function of capturing a plurality of images including an image of a short exposure time and having a high resolution, but having much noise, and an image of a long exposure time, but having little noise and a low resolution.

The imaging apparatus 10 has a function of detecting positional deviation among captured images and blurring amounts, changing a ratio of a plurality of images according to the distances from the edge, and combining these to thereby form images free from blurring and reducing noise.

The imaging element 12 is formed by a CCD, CMOS sensor, or the like, receives an optical image of a subject passed through the optical system 11, performs photo-electric conversion, and supplies the result to the signal processing part 13. In the following explanation, the explanation will be given while assuming that the imaging element 12 is formed by a CCD.

The optical system 11 and imaging element 12 of the present embodiment can, for example, take pictures by long time exposure in a low CCD sensitivity state, that is, with little noise, but a slow shutter speed, and take pictures with much noise, but a short exposure time by changing the CCD sensitivity under the control of the CPU 14.

The signal processing part 13 performs color interpolation, white balancing, YUV conversion, compression, filtering, and other processing, and performs storage in the memory 15, and so on.

The signal processing part 13 of the present embodiment has the function of extracting a luminance signal portion from captured data in the optical system 11 and imaging element 12 and a filtering function for eliminating a noise component of the luminance signal Y. The filtering is processing by a filter coefficient for reducing the noise component without lowering the resolution. As general ones, a median filter, edge preservation filter, and other filters can be applied.

The signal processing part 13 stores an image after filtering in accordance with each captured data in the memory 15.

The CPU 14 controls the exposure and, at the same time, waits for operation inputs of a not shown operation portion etc., determines the operation of the entire system in accordance with those inputs, controls the optical system 11, imaging element 12, signal processing part 13, etc., and controls the system as a whole by mediation.

Further, the CPU 14 has the function of detecting the positional deviation among captured images and blurring amounts based on the data after the signal processing of the signal processing part 13 stored in the memory 13, changing ratios of a plurality of images according to distances from the edge, and combines these to thereby form an image free from blurring and reducing noise.

More specifically, it has a detection function of detecting positional deviation among a plurality of images under different exposure conditions and blurring amounts and a combining function of extracting edge components of images including positional deviation and blurring amounts based on detection results of the detection function, setting a ratio in combining images according to the distances from the extracted edges, and combining images with the set ratio.

The CPU 14, in the detection function, calculates a difference of luminance signals Y obtained by capture under different exposure conditions and processed in the signal processing part 13 (short time exposed image YS—long time image exposure YL), and detects positional deviation and blurring amounts. This image is obtained by subtracting the image of long time exposure and having blurring from a short time exposed image, therefore an image of an edge including blurring will be generated.

The CPU 14, in the combining function, extracts an edge component from an image including positional deviation and blurring from the generated image and sets a ratio in combination in accordance with the distance from this edge.

The CPU 14, when setting the ratio, sets the ratio of the image of long time exposure and having little noise larger according to an increase of the distance from the edge in the combining function. On the other hand, it sets the edge portion so that the ratio of the image of short time exposure and having a resolution feeling becomes higher.

For example, it is sufficient to set the ratio of the image of short time exposure to 100% in the edge portion, raise the ratio of the image of long time exposure in steps the further from the edge, and make the ratio variable up to 50% in the noise portion.

Further, the CPU 14 combines images while making the ratio of the short time exposed image larger when the distance from the edge is nearer than the distance set in advance and combines images while making the ratio of the long time exposed image larger when the distance from the edge is further than the distance set in advance.

In this way, the CPU 14 combines images while taking the distance from the edge and the ratio between images. This processing is repeatedly carried out for a plurality of images. At a stage where the processing of all images ends, an output image reduced in noise and free from blurring is obtained.

The CPU 14 stores the image data after processing in the memory 15.

Below, examples of a plurality of images captured under different exposure conditions, the reason for use of the luminance signals Y in the YIN conversion format of the captured images for the combination of the images, and the difference image of the Y signal components of the captured plurality of images will be explained in further detail.

Figures 2A, 2B, 2C:
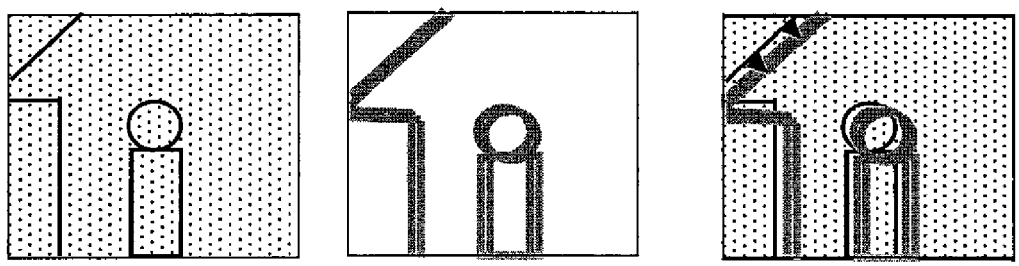
FIG. 2A to FIG. 2C are diagrams showing examples of a plurality of images captured under different exposure conditions.

FIG. 2A to FIG. 2C are views showing two images captured under different exposure conditions and an example of an image obtained by combining these.

FIG. 2A shows an image of a short exposure time having no blurring, but having much noise since the sensitivity is high. For example, this was captured in a state where the shutter speed was short and the sensitivity was high. The resolution was high, but noise was included in the entire image since the sensitivity was raised.

FIG. 2B shows an image of a long exposure time having blurring, but having little noise since the sensitivity is low. For example, this was captured in a state where the shutter speed was long and the sensitivity was low. The resolution was low, and there was a possibility of occurrence of hand shake, but this was an image having little noise FIG. 2C is an image obtained by combining the images of FIG. 2A and FIG. 2B.

Even when a plurality of images are continuously captured, as shown in FIG. 2A to FIG. 2C, positional deviation occurs among pictures.

Next, the YUV format of the captured images will be explained.

The signals handled in this format are the luminance signal Y, color difference signal U, and color difference signal V. Among these signals Y, U, and V, the Y signal component exerts a large influence as the element determining the resolution.

As the principle of image compression, for example the compression is carried out while reducing the color difference signals in the JPEG or the like. The human eye is relatively insensible to color information, therefore a large effect of reduction of noise can be achieved by combining the luminance signals Y.

FIG. 3A to FIG. 3C are views showing an image of the Y signal component captured by a short time exposure, an image of the Y signal component captured by a long time exposure, and a difference image of Y signal components of a plurality of images.

In positional deviation among a plurality of image captures and long time exposure, hand shake is included, and the image blurs.

When continuously taking pictures, a large positional deviation does not occur at the edge portion of the subject of the image. Further, this is a difference image of Y signal components, therefore an image enhanced in the edge portion and blurred portion is obtained.

In the present embodiment, a plurality of images are combined from the difference images by a ratio based on the distance from the edge based on an image having a high resolution, but having much noise.

FIG. 4A to FIG. 4C are views showing the relationship between the difference images and the ratio in combination, in which FIG. 4A shows an image before the noise reduction processing, FIG. 4B shows an image obtained by enlarging the subject portion, and FIG. 4C shows an output image.

The edge portion of the difference image becomes as shown in the figures. Pixels adjoining the image do not largely change. Therefore, when away from the edge by a predetermined distance or more, an image having a relatively small change is obtained.

From this, in the vicinity of the edge, the image processing is carried out with a combination ratio given a certain predetermined inclination as shown in FIG. 4B.

For example, with an image of a wall or uniform plane behind the subject with noise, an image where noise is remarkable and uneven is reduced in noise by performing this processing.

In the present embodiment, the processing time is shortened by eliminating noise by only the Y component among Y, U, and V.

Further, in the present embodiment, the positional deviation and blurring are extracted from the difference image of a plurality of images, but it is also possible to detect the accurate amount of deviation by pattern matching etc. to change the combination ratio.

Figure 5:
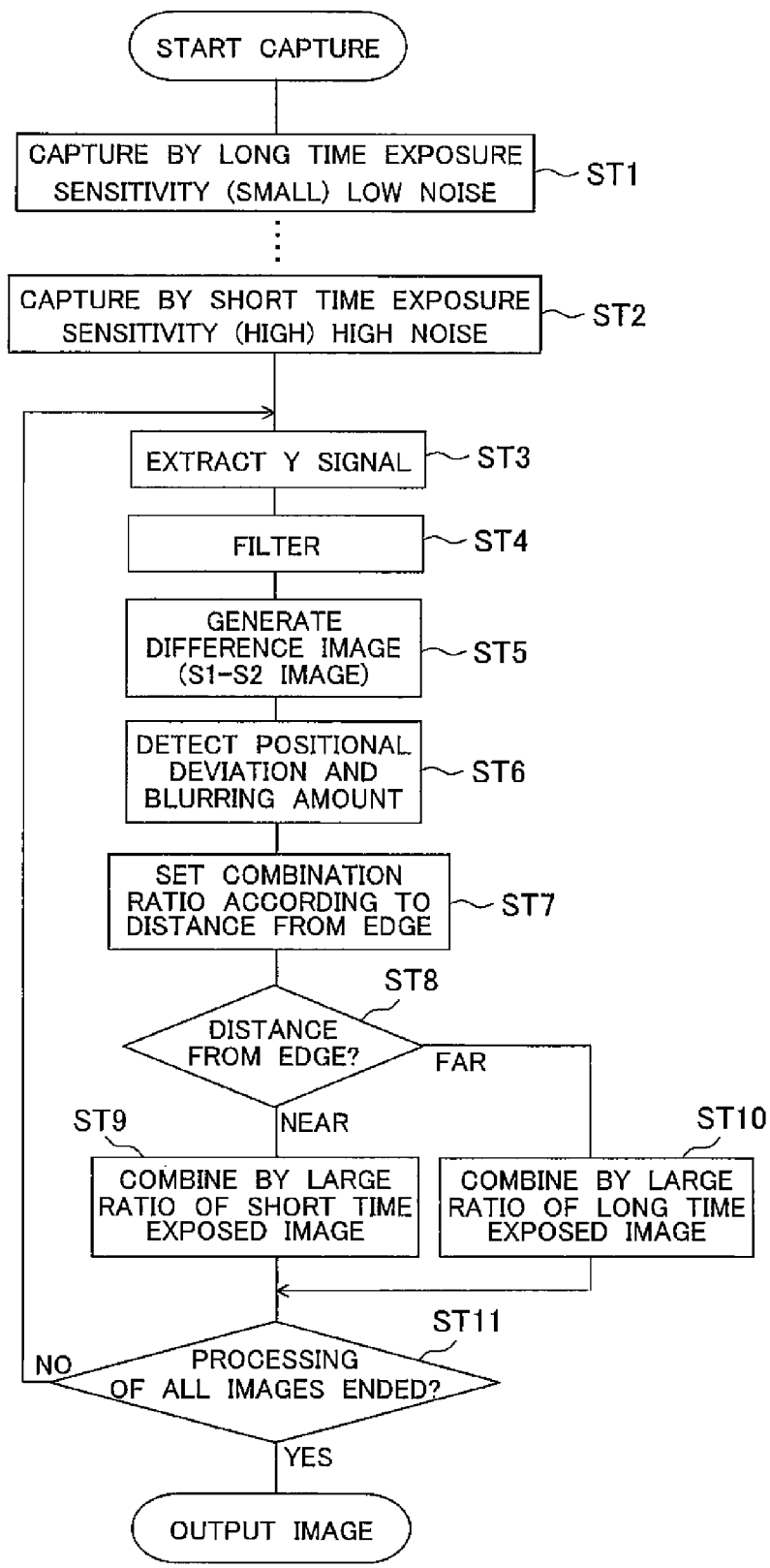
FIG. 5 is a flow chart for explaining an operation of the present embodiment.

Next, the operation according to the above configuration will be explained with reference to the flow chart of FIG. 5.

First, under the control of the CPU 14, the optical system 11 and imaging element 12 are driven to take pictures. At step ST1, a picture is taken by long time exposure in the state where the CCD sensitivity is low, that is, where the noise is small, but the shutter speed is slow.

Next, at step ST2, a picture is taken with much noise, but short exposure time by changing the CCD sensitivity.

Then, the signal processing part 13 extracts a luminance signal portion from each captured data at step ST3 and performs filtering for eliminating the noise component of the luminance signal at step ST4.

After this, the CPU 14 performs the following processing.

At step ST5, the difference of processed captured luminance signals (short time exposed image YS(S1)—long time image exposure YL(S2)) is calculated. This image is obtained by subtracting the image of long time exposure having blurring from the image of short time exposure, therefore an image of an edge including blurring will be generated.

Next, at step ST6, the positional deviation and the deviation by blurring occurring when capturing a plurality of images are found from the image as a motion vector.

At step ST7, from the image generated at step ST6 as described above, the edge component is extracted from the image including positional deviation and blurring, and the ratio is set in accordance with the distance from there. In this case, according to the distance from the edge, the ratio of the image of long time exposure having little noise is made larger, and the edge portion is set so that the ratio of the image of short time exposure having a resolution feeling becomes high.

The steps after step ST8 are classified into the processing of step ST9 or of step ST10 in accordance with the distance from the edge. The images are combined according to the ratio.

When the distance from the edge is nearer than the distance set in advance, at step ST9, the images are combined while making the ratio of the short time exposed image larger.

When the distance from the edge is further than the distance set in advance, at step ST10, the images are combined while making the ratio of the long time exposed image larger.

This processing is repeatedly carried out for a plurality of images.

At step ST11, at a stage where the processing of all images ends, an output image reduced in noise and having no blurring is obtained.

Note that, in the present embodiment, the case of combining two images was explained, but three or more images may also be combined. For example, in the case of combining three, the ratio in combination may be set according to the distance from the edge in accordance with each exposure condition.

As explained above, in the present invention, by performing the image processing while changing the combination ratio according to the distance from the edge of the difference image from among a plurality of images captured under different exposure conditions, a noise reduction effect can be achieved and pictures can be taken corresponding to the positional deviation among captured images and blurring.

Accordingly, a reduction of the required memory capacity, shortening of the processing time, ensuring of part mounting space, reduction of costs, and other large effects are obtained.

The combination processing of the present embodiment was explained by taking as an example the case where the luminance signal Y in the YUV format (Y is the luminance signal, U and V are color difference signals) after signal processing of captured images was used for combining the images, but this can be applied to a case where the images are combined with respect to output of RGB Bayer alignment (RAW data) from the imaging element (sensor) as well.

In this case, the CPU 14 takes the difference by extracting the Gr component from the RAW image data of the captured plurality of images and detects the edge and blurring component from the difference image. In the RAW image signal, in an analog stage, a gain of white balance has been already applied to R and B components, therefore the R and B components have much more noise in comparison with the G component. For this reason, in the present embodiment, a Gr component having little noise may be extracted, Note that it is also possible to perform the extraction for other R, G, and Gb.

Further, for example the CPU 14 calculates an absolute value of the difference image of positional deviation corrected images (short time exposed image S1—long time image exposure S2).

This image is obtained by subtracting the image of long time exposure having blurring from the image of short time exposure, therefore an image of an edge including noise and blurring will be generated.

INDUSTRIAL APPLICABILITY

In the imaging apparatus and imaging method of the present invention, an image free from blurring can be obtained with a small number of images under different exposure conditions, and it is possible to shorten the processing time. Therefore, the invention can be applied to digital still cameras, phone-mounted cameras, personal digital assistant-mounted cameras, and so on.

The invention claimed is:

1. An imaging apparatus having a function of combining a plurality of images captured under different exposure conditions, comprising:
a detecting means for detecting positional deviation among the plurality of images and blurring amounts and
a combining means for setting a ratio of images, captured under different exposure conditions, in combination according to a distance from an edge extracted based on detection results of the detecting means and combining images with the set ratio,
wherein the combining means makes the ratio of an image of a long time exposure and having little noise larger as the distance from the edge becomes larger and sets an edge portion so that the ratio of an image of a short time exposure and having high resolution becomes larger.

2. An imaging apparatus as set forth in claim 1, wherein the combining means combines images based on at least a luminance signal among a luminance signal Y and color difference signals U and V.

3. An imaging apparatus as set forth in claim 1, wherein the combining means combines images based on at least a G component among data of output of an imaging element.

4. An imaging apparatus as set forth in claim 1, wherein at least one of the plurality of images for combination includes an image having noise and a high resolution.

5. An imaging apparatus as set forth in claim 1, wherein at least one of the plurality of images for combination includes an image having a low resolution, but having little noise.

6. An imaging apparatus as set forth in claim 1, wherein the detecting means extracts positional deviation between images and a blurring amount from a difference image of the plurality of images.

7. An imaging apparatus as set forth in claim 6, wherein when the distance from the edge is nearer than the distance set in advance, the combining means combines images while making the ratio of the short time exposed image larger.

8. An imaging apparatus as set forth in claim 6, wherein when the distance from the edge is further than the distance set in advance, the combining means combines images while making the ratio of the long time exposed image larger.

9. An imaging method of combining a plurality of captured images under different exposure conditions, comprising:
a first step of detecting positional deviation among a plurality of images and blurring amounts,
a second step of extracting an edge based on detection results in, the first step,
a third step of setting a ratio in combination of an image captured under an exposure condition to another image captured under another exposure condition according to a distance from the extracted edge, and
a fourth step of combining images with a ratio set in the third step,
wherein the fourth step makes the ratio of an image of a long time exposure and having little noise larger as the distance from the edge becomes larger and sets an edge portion so that the ratio of an image of a short time exposure and having high resolution becomes larger.

10. An imaging method as set forth in claim 9, wherein the fourth step combines images based on at least a luminance signal among a luminance signal Y and color difference signals U and V.

11. An imaging method as set forth in claim 9, wherein the fourth step combines images based on at least a G component among data of output of an imaging element.

12. An imaging method as set forth in claim 9, wherein at least one of the plurality of images for combination includes an image having noise and a high resolution.

13. An imaging method as set forth in claim 9, wherein at least one of the plurality of images for combination includes an image having a low resolution, but having little noise.

14. An imaging method as set forth in claim 9, wherein the first step means extracts positional deviation between images and a blurring amount from a difference image of the plurality of images.

15. An imaging method as set forth in claim 14, wherein when the distance from the edge is nearer than the distance set in advance, the fourth step combines images while making the ratio of the short time exposed image larger.

16. An imaging method as set forth in claim 14, wherein when the distance from the edge is further than the distance set in advance, the fourth step combines images while making the ratio of the long time exposed image larger.

* * * * *